Aug. 19, 1958     L. L. P. CROTEAU     2,847,688
GLASS WASHER
Filed Oct. 23, 1956

INVENTOR.
LIONEL L. P. CROTEAU
BY
McMorrow, Berman & Davidson
ATTORNEYS

United States Patent Office 2,847,688
Patented Aug. 19, 1958

2,847,688

GLASS WASHER

Lionel L. P. Croteau, Hamilton, Ontario, Canada

Application October 23, 1956, Serial No. 617,724

2 Claims. (Cl. 15—76)

This invention relates to a device to facilitate the washing of glasses, and more particularly has reference to a device of this nature mounted in the bottom of a sink or other receptacle and including brushes so mounted as to rotate in contact with the outer and inner surfaces of the glass responsive to a straight downward motion of the glass without accompanying rotation of the glass itself.

The main object of the present invention is to provide a generally improved device of the nature described. Broadly speaking, glass washers including rotary brushes mounted to contact the surface of the glass are not new per se. However, those devices of which I have knowledge, that have previously been conceived, have been noted as having certain deficiencies, which it is intended to correct by a novelty designed structure, in carrying out the present invention.

One important object of the present invention is to improve upon previously conceived devices falling within the same general category by causing movement of the outer brushes radially inwardly of the glass into intimate contact with the outer surface of the glass, responsive to a straight downward motion of the glass while holding the glass against rotation.

Another object is to provide an improved glass washer wherein said movement of the outer brushes into contact with the outer surface of the glass will occur prior to imparting rotary motion to the outer and inner brushes, that is, it is proposed to provide successively following steps of operation involving first the radial inward movement of the outer brushes and second the rotary motion of the outer and inner brushes, with the sequence taking place responsive to a continuous straight downward motion of the glass into the rinse or wash water.

A further object is to provide means designed to effect rotation of the outer and inner brushes in an opposite direction on return movement of the glass to its upper position, after the glass has reached the lower limit of its travel and downward pressure thereon has been released by the user.

A further object is to effect, in the return movement of the glass, movement of the outer brushes radially outwardly out of contact with the outer surface of the glass at the time the glass has reached the full limit of its upper travel and rotation of the brushes has already ceased, thus to reverse the initial sequence of steps and free the glass for removal from the device.

Still another object is to so form the glass washer that it will involve a minimum number of parts, simply arranged in a manner whereby they will not readily get out of order and whereby, further, they can be manufactured and assembled at a relatively low cost, from non-corrosive, durable materials.

Other objects will appear from the following description, the claims appended thereto, and from the annexed drawing, in which like reference characters designate like parts throughout the several views, and wherein:

Figure 1:
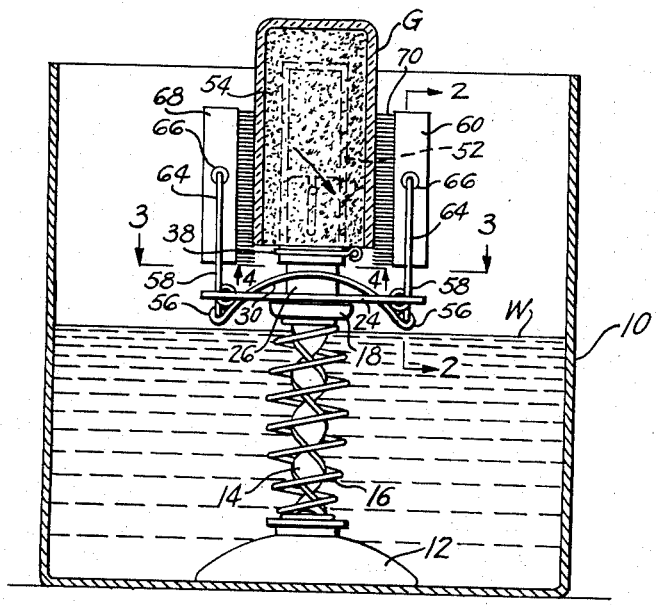
Figure 1 is a view of the glass washer showing the same in elevation, a glass to be washed and a receptacle in which the glass is disposed being illustrated in longitudinal section.

Referring to the drawings in detail, designated at 10 is a receptacle holding a quantity of water W. Said receptable may be an ordinary sink, and in use of the invention, it may be noted at this point that ordinarily two of the devices would be employed, one disposed in a receptacle containing wash water, that is water charged with detergent or soap, and the other being mounted in a receptacle containing rinse water. A glass would first be positioned upon the device in the wash water, and after having been washed by a reciprocating motion of the glass, would be transferred to the rinse water receptacle, to be again positioned upon one of the devices and rinsed, through operation of the device used in the rinse water.

The glass washer constituting the present invention includes a base 12 which may be weighted or otherwise formed or mounted in a manner to be supported on the bottom of the water receptacle 10 with maximum stability.

Fixedly secured at its lower end to the center of the base 12 and projecting upwardly from the base is a spiralling rod 14, surrounding by a spring 16 of the coiled compression type. Spring 16 is progressively increased in diameter from each end thereof toward its center, so that when the spring is fully compressed, it will still be wholly spaced from the rod 14 to assure proper operation of the device.

At its upper end, spring 16 abuts against a shallowly cupped ball-bearing retainer 18. Loosely positioned within said retainer is a disc 20 having freely rotatable ball elements 22 angularly spaced uniformly about its circumference. The upper end of the spring may be fixedly secured to the shallow bearing retainer 18 to insure that the retainer will remain properly centered relative to the spring, but in any event the retainer is intended to remain stationary, in the sense that it does not rotate about the spiral rod 14.

Engaged at its underside by the ball elements 22 and spaced upwardly a sort distance from the periphery of the bearing retainer 18, is an elongated, rectangular outer brush support plate 24. Welded to or otherwise fixedly secured to the center portion of plate 24 is an upwardly projecting support tube 26, and in the lower end of the tube 26 there is mounted a plug 28, fixedly connected to tube 26 and to plate 24, and formed with a diametrically extending slot 29 (Figure 3), spiralling correspondingly to the spiral rod 14. If the thickness of the plug should be reduced, as might be desired, then the slot 29 need not be spirally formed between the top and bottom faces of the plug, and could merely comprise a straight slot loosely receiving the spiralling rod.

Due to the construction so far illustrated and described, it will be seen that on depression of plate 24, spring 16 will be placed under increased compression, and plate 24 will at the same time be rotated, due to the engagement of the spiralling rod 14 in the slot 29. Plate 24 will rotate with tube 26 and plug 28, while the retainer 18 will remain stationary. The bearing retainer 18 and the bearing plate 20 are both centrally apertured to receive the rod 14 without engaging said rod. Free rotation of the plate 24 is assured due to the fact that said plate is in contact entirely with the ball elements 22.

An elongated leaf spring 30 has a widened midlength portion (Figure 3) merging into narrower end portions. Leaf spring 30 is bowed upwardly medially between its ends, above plate 24, and the end portions of the leaf spring are extended into rectangular openings 32 disposed adjacent the ends of the plate 24.

The support tube, at its upper end, has an elongated longitudinal slot or keyway 48, receiving a pin 50 projecting radially outwardly from the wall of a tubular center brush including a sleeve 52 carrying the pin 50. Sleeve 52 is thus slidable longitudinally of and upon the tube 26, the pin 50 moving upwardly and downwardly within slot 48 as necessary during the longitudinal movement of the sleeve. Embedded in the outer surface of the sleeve are bristles 54, adapted to engage the inner surface of a glass G that is to be washed. Sleeve 52 is closed at its upper end, with the bristles being continued over the upper end of the sleeve, so as to engage the bottom of the glass when the glass is inverted and positioned upon the center brush.

Adjacent its lower end, the sleeve 52 is formed with diametrically opposed, circumferentially extending slots 42 (Figures 4 and 5), while the tube 26 at corresponding, diametrically opposite locations is formed with elongated openings 40 defining recesses in opposite sides of the tube 26.

Figure 4:
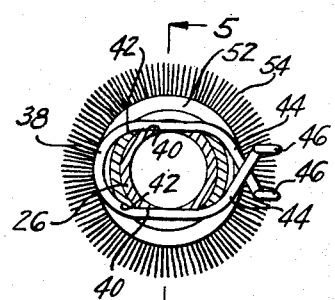
Figure 4 is a transverse sectional view, on the same scale as Figure 3, on line 4—4 of Figure 1, illustrating the center brush and the support means therefor.
Figure 5:
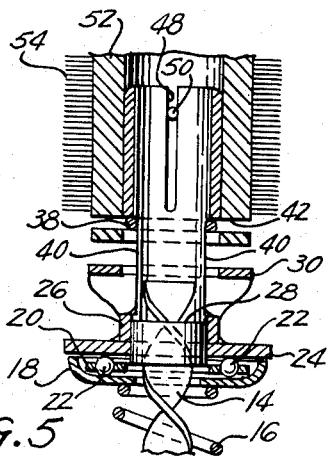
Figure 5 is an enlarged, longitudinal section through the center brush and through the rotatable mounting of the outer and inner brush assemblies, substantially on line 5—5 of Figure 4.

A spring clip 38, shown to best advantage in Figure 4, is formed from a single length of spring wire material, and includes a bight portion merging into legs that are spring tensioned to engage in the slots 42 and recesses 40 to hold the sleeve 52 and the tube 26 assembled for joint rotation. The elongation of the recesses 40 is for the purpose of permitting the sleeve 52 to shift longitudinally of the tube 26 in the manner previously described.

With further reference to the clip, it will be noted that the legs thereof, at the ends of the legs remote from the bight, are formed with crossing extensions 44 the free ends of which are provided with eyes 46. The eyes 46 facilitate grasping of the crossed extensions 44, for the purpose of shifting the eyes 46 toward each other, thus to spread the legs of the clip and release the sleeve 52 from the tube 26, whereby said sleeve 52 can be removed and washed or replaced by a brush of different size, etc.

Figure 2:
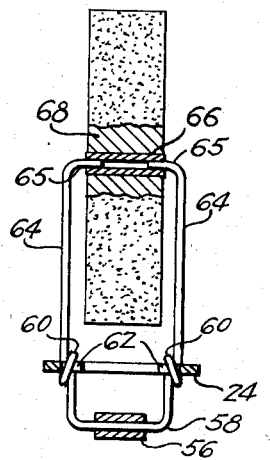
Figure 2 is an enlarged sectional view through one of the outer brushes, substantially on line 2—2 of Figure 1.
Figure 3:
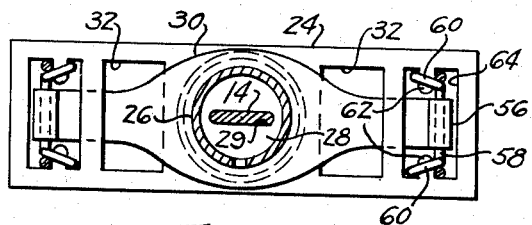
Figure 3 is a horizontal section, on an enlarged scale, substantially on line 3—3 of Figure 1, showing the outer brush holder.

Referring now to Figures 1, 2, and 3, the ends of the flat leaf spring 30 are spaced a substantial distance downwardly from the plane of plate 24, and are rolled to define hinge sleeves 56 receiving generally outer brush support frames 58 each of which is formed from relatively rigid, stout wire or rod material. Frames 58 are formed, adjacent their lower ends, with loops 60, which as shown in Figure 3 are loosely pivoted on inwardly projecting fingers 62 formed in end openings 64 of plate 24.

The frames are thus pivoted upon the ends of plate 24 upon axes lying in the plane of and extending transversely of the plate 24. The pivot axes of the frames are disposed intermediate opposite ends of the frames, so that assuming that the lower ends of the frames are rocked outwardly in Figure 1, the upper ends thereof will be rocked inwardly, radially of and toward the center brush and a glass G supported upon the center brush.

The upper ends of the frame are formed with inwardly projecting fingers, said upper ends being designated 64 and including fingers 65 pivotally engaged in opposite ends of pivot sleeves 66 embedded in and extending transversely of brush bases 68 of the outer brushes, said outer brushes also including bristles 70 projecting toward the bristles of the center brush.

Thus, the outer brushes are loosely pivoted upon the plate, and by location of the pivot axes defined by the fingers 65 and pivot sleeves 66 above the midlength points of the outer brushes, said brushes will normally gravitate to vertical positions as shown in Figure 1. They are, however, freely swingable out of said positions so that they may be self-adjusting to tilted positions, if the glass G has, instead of straight sides, flared or otherwise ornamentally shaped side walls.

In use of the device, it is positioned in receptacle 10, and initially, the outer brushes will be spaced apart a greater distance than they are in Figure 1. This is due to the fact that leaf spring 30, when free to flex to its normal position, pulls inwardly upon the lower ends of the frames 58 of the outer brushes, so as to cause the outer brushes to swing away from each other. This facilitates positioning of glass G upon the center brush. The glass is positioned upon the center brush, and is pressed straight downwardly without any necessity of manually rotating the glass. The glass, in fact, does not rotate at all during the operation of washing the same.

When the glass is forced downwardly upon the center brush, ultimately the upper end of the center brush is engaged by the bottom of the glass. Thereafter, continued downward movement of the glass will cause the center brush to be moved downwardly, the center brush sliding upon the tube 26. Eventually the lower end of the sleeve 52 of the center brush bears against the upwardly bowed midlength portion of the leaf spring 30 and tends to flatten out the leaf spring. This causes the frames 64 to be swung in opposite directions about the pivot axes thereof, with the lower ends of the frames being shifted outwardly and the upper ends of the frames traveling radially, inwardly of the glass to bring the bristles 70 into intimate contact with the outer surface of the glass.

There is still no rotation of the brushes, but continued downward movement of the glass, with spring 30 flattened to its maximum extent, causes the plate 24 to be shifted downwardly upon the spiralling rod, against the restraint of spring 16. This causes the plate 24 to begin rotating, and it rotates throughout its movement downwardly along the length of the rod 14 until the spring 16 has been compressed with maximum extent.

The rapid rotation of the plate 24 causes rotation of the center brush in the same direction, about the same axis as that on which the plate 24 is turning. Further, the outer brushes are rotated bodily in a common circular path, about the same axis of rotation, and as a result, the glass is effectively washed inside and out.

When the lower limit of travel of the glass has been reached, the user relieves the pressure on the glass, and permits it to rise to its initial position. During the upward movement of the glass, the plate 24 will turn in an opposite direction, causing correspondingly opposite rotation of the center and outer or side brushes. This continues the scrubbing action on the glass until the upper limit of travel of the glass has been reached.

It will be noted that when the glass reaches the upper limit of its travel, initially the rotation of the brushes will stop, and then the spring 30 will be relieved of the pressure as the center brush moves upwardly therefrom. The spring 30 flexes back to its original curvature, causing the upper ends of the frames 58 to swing outwardly, out of engagement with the outer surface of the glass, thus to free the glass for removal.

Rinsing of the glass may be effected in another, adjacent receptacle containing rinse water, in which other receptacle there would be disposed a device similar to that illustrated and described herein.

It will be seen that the device can be readily disassembled for cleaning of the component parts thereof, or for replacement of the brushes. Further, the device would be made wholly of non-corrosive materials, so as to be usable over a long period of time. The device is still further characterized by the relatively low cost and simplicity of operation thereof, considering the benefits to be obtained. In this regard, it is important to note that the side brushes are swung inwardly into engagement with the side wall of the glass, responsive to a straight downward motion of the glass, this movement of the side brushes into engagement with the glass taking place previous to the rotation of the brushes, which rotary motion of the brushes results from still further downward movement of the glass. A single downward movement of the glass, and its return movement, is in most instances adapted to permit swift cleaning of the same, thus permitting the washing of glasses at a relatively low cost, with maximum ease on the part of the user, and at a rapid speed.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, and the means presently devised to carry out said principles, it being considered that the invention comprehends any minor change in construction that may be permitted within the scope of the appended claims.

What is claimed is:

1. A glass washer comprising a base; a spiral rod rigid with and projecting upwardly from the base; a support plate receiving said rod; means on the support plate having a slot receiving the rod, whereby to cause rotation of the plate on the exertion of pressure thereagainst tending to move the same downwardly against the rod; a center brush projecting upwardly from the support plate and having a connection to the support plate adapted for effecting conjoint rotation of the center brush and the support plate; side brushes pivotally mounted upon the support plate in positions spaced laterally outwardly from the center brush; means connected with the side brushes adated for shifting the same radially inwardly toward the center brush into engagement with a supported glass, responsive to downward pressure exerted on the center brush to shift the same downwardly with the support plate upon the rod; and means extending about the rod between the base and the lower plate adapted for resiliently, yieldably opposing the downward movement of the plate, thus to effect return movement of the plate following shifting of the same to the lower end of the rod, said connection of the center brush to the plate comprising a tube projecting upwardly from and rigid with the plate, the center brush including a sleeve receiving the tube, the sleeve and tube being connected for relative longitudinal movement, and for conjoint rotation, said means for shifting the side brushes toward the center brush comprising an upwardly bowed leaf spring carried by said plate, the side brushes including frames pivoted on the plate outwardly from the axis of rotation of said plate, said leaf spring having its ends connected to the frames, for rocking of the frames about the pivot axes thereof responsive to flattening of the leaf spring, said leaf spring disposed in the path of slidable movement of the sleeve of the center brush, whereby to be flattened responsive to the downward pressure exerted on the center brush tending to shift the same longitudinally of the tube.

2. A glas washer comprising a base; a spiral rod rigid with and projecting upwardly from the base; a support plate receiving said rod; means on the support plate having a slot receiving the rod, whereby to cause rotation of the plate on the exertion of pressure thereagainst tending to move the same downwardly against the rod; a center brush projecting upwardly from the support plate and having a connection to the support plate adapted for effecting conjoint rotation of the center brush and the support plate; side brushes pivotally mounted upon the support plate in positions spaced laterally outwardly from the center brush; means connected with the side brushes adapted for shifting the same radially inwardly toward the center brush into engagement with a supported glass, responsive to downward pressure exerted on the center brush to shift the same downwardly with the support plate upon the rod; and means extending about the rod between the base and the lower plate adapted for resiliently, yieldably opposing the downward movement of the plate, thus to effect return movement of the plate following shifting of the same to the lower end of the rod, said connection of the center brush to the plate comprising a tube projecting upwardly from and rigid with the plate, the center brush including a sleeve receiving the tube, the sleeve and tube being connected for relative longitudinal movement, and for conjoint rotation, said means for shifting the side brushes toward the center brush comprising an upwardly bowed leaf spring carried by said plate, the side brushes including frames pivoted on the plate outwardly from the axis of rotation of said plate, said leaf spring having its ends connected to the frames, for rocking of the frames about the pivot axes thereof responsive to flattening of the leaf spring, said leaf spring being disposed in the path of slidable movement of the sleeve of the center brush, whereby to be flattened responsive to the downward pressure exerted on the center brush tending to shift the same longitudinally of the tube, said leaf spring having its midlength portion projecting above the plane of said plate, the end portions of the leaf spring extending below the ends of the plate and being connected to the lower extremities of the side brush support frames, said frames having their pivot axes disposed in the plane of and extending transversely of the plate, intermediate the ends of the frames.

References Cited in the file of this patent
UNITED STATES PATENTS

| | | |
|---|---|---|
| 717,061 | Witte | Dec. 30, 1902 |
| 2,506,075 | Fleury | May 2, 1950 |